United States Patent
Smith et al.

[11] Patent Number: 6,138,581
[45] Date of Patent: Oct. 31, 2000

[54] RAILWAY GONDOLA CAR

[75] Inventors: Stephen W. Smith, Dallas; John W. Coulborn, Fort Worth, both of Tex.

[73] Assignee: TRN Business Trust, Dallas, Tex.

[21] Appl. No.: 09/090,592

[22] Filed: May 27, 1998

[51] Int. Cl.[7] .................................................. B61D 17/00
[52] U.S. Cl. ...................... 105/406.1; 105/411; 105/413; 105/416; 105/418; 105/419
[58] Field of Search ............................... 105/406.1, 422, 105/404, 244, 239, 409, 411, 413, 406.2, 416, 417, 418, 419

[56] References Cited

U.S. PATENT DOCUMENTS

| | | | |
|---|---|---|---|
| 45,834 | 1/1865 | Keeler | 105/359 |
| 190,542 | 5/1877 | Brooks . | |
| 719,868 | 2/1903 | Randel | 105/282 R X |
| 750,049 | 1/1904 | Carnahan | 105/406 R |
| 785,174 | 3/1905 | King | 105/406 R |
| 861,208 | 7/1907 | Dodds . | |
| 884,325 | 4/1908 | Dodds | 105/251 |
| 921,112 | 5/1909 | Howard . | |
| 934,578 | 9/1909 | Stoller . | |
| 1,054,087 | 2/1913 | Campbell . | |
| 1,069,763 | 8/1913 | Campbell . | |
| 1,314,045 | 8/1919 | Campbell . | |
| 1,412,660 | 4/1922 | Kuehner | 105/282 R X |
| 1,531,761 | 3/1925 | Seiders | 105/406 R |
| 1,627,256 | 5/1927 | Smith | 105/282 R X |
| 1,828,842 | 10/1931 | Loucks | 105/422 |
| 3,175,520 | 3/1965 | Talmey | 105/419 X |
| 3,240,168 | 3/1966 | Charles et al. | 105/406 |
| 3,420,192 | 1/1969 | Ellis | 105/422 |
| 3,713,400 | 1/1973 | Teoli | 105/422 R |
| 3,772,997 | 11/1973 | Heap et al. | 105/406 R |
| 3,776,144 | 12/1973 | Eislers | 105/406 R |
| 3,817,189 | 6/1974 | Bailey et al. | 105/406 |
| 3,841,236 | 10/1974 | Hammonds et al. | 105/364 |
| 3,918,370 | 11/1975 | Campbell et al. | 105/416 |
| 3,964,399 | 6/1976 | Miller et al. | 105/406 R |
| 4,212,252 | 7/1980 | Hart et al. | 105/406 R |
| 4,236,459 | 12/1980 | Teoli | 105/406 R |
| 4,254,714 | 3/1981 | Heap | 105/406 |
| 4,306,505 | 12/1981 | Zehnder et al. | 105/406 |
| 4,331,083 | 5/1982 | Landregan et al. | 105/406 R |
| 4,361,097 | 11/1982 | Jones et al. | 105/406 R |
| 4,408,542 | 10/1983 | Heap | 105/406 |
| 4,417,526 | 11/1983 | Marulic et al. | 105/406.1 |
| 4,633,787 | 1/1987 | Przybylinski et al. | 105/406 |
| 4,898,101 | 2/1990 | Harter | 105/406.1 |
| 4,911,082 | 3/1990 | Richmond | 105/406 |
| 5,341,747 | 8/1994 | Fetterman et al. | 105/406 |
| 5,373,792 | 12/1994 | Pileggi et al. | 105/406 |

FOREIGN PATENT DOCUMENTS 1064788  12/1963  United Kingdom .

OTHER PUBLICATIONS

Carbuilder; Pulman Standard; Jan. 1977; Issue No. 1; Front Cover, XXX1X, 8, 9, and Rear Mailing Cover Pages.
Progressive Railroading; Murphy–Richter Publishing Co.; Aug. 1977; It's Called the "Coalporter"; Front Cover, Contents (5), p. 67.

*Primary Examiner*—S. Joseph Morano
*Assistant Examiner*—Lars A. Olson
*Attorney, Agent, or Firm*—Baker Botts L.L.P.

[57] ABSTRACT

A railway gondola car having trucks for movably supporting the car on railway tracks includes a center sill and a gondola body supported by the trucks. The gondola body includes first and second ends, a first side, a second side, and a bottom assembly. The bottom assembly includes a trough disposed between the trucks and attached to the first and second sides. The bottom assembly also includes a generally hat-shaped stiffener attached to the trough, the first side, and the second side.

34 Claims, 5 Drawing Sheets

RAILWAY GONDOLA CAR

BACKGROUND OF THE INVENTION

Railway cars are useful for transporting large amounts of cargo. One example of a railway car for transporting large amounts of bulk material is an open top rotary dump-type gondola car. This type of gondola car has an open top for receiving large amounts of bulk material for transporting the bulk material from one location to another. Upon reaching a designated destination, the gondola car may be inverted, thereby dumping the bulk material from the gondola car.

Since most bulk material carried by railway gondola cars are of a granular or lump-form type, such as coal, sand, or gravel, some railway gondola cars of the rotary dump-type are constructed to include a depressed bottom assembly for increased capacity of the gondola railway car. Additionally, the depressed bottom assembly lowers the center of gravity of the railway gondola car and provides reduced wind resistance from the railway gondola car due to its lower profile.

Railway gondola cars having a depressed bottom assembly, however, suffer several disadvantages. For example, the load experienced by the bottom assembly of the railway gondola car must be supported by or transferred to a main load bearing structure of the railway gondola car. However, placing a load bearing structure within a portion of the bottom assembly of the railway gondola car decreases cargo capacity of the railway gondola car. Additionally, reducing the size of the bottom assembly of the railway gondola car, or utilizing a bottom assembly having a number of longitudinal or lateral compartments to redistribute the load from the bottom assembly or provide room for load bearing structures reduces the overall capacity of the railway gondola car and prevents effective unloading and clean-out of the railway gondola car.

SUMMARY OF THE INVENTION

Accordingly, a need has arisen for an improved railway gondola car that provides increased cargo-carrying capability. The present invention provides an improved railway gondola car that addresses shortcomings of prior railway gondola cars and increases cargo-carrying capability.

According to one embodiment of the invention, a railway gondola car having trucks for movably supporting the gondola car on railway tracks includes a center sill and a gondola body supported by the trucks. The gondola body includes first and second ends, a first side, a second side, and a bottom assembly. The bottom assembly of the railway gondola car includes a trough disposed between the trucks and attached to the first side and the second side. The bottom assembly also includes a generally hat-shaped stiffener attached to the trough, the first side, and the second side.

According to another embodiment on the invention, a railway gondola car including trucks for movably supporting the gondola car on railway tracks includes a center sill extending between the trucks and a gondola body supported by the trucks. The gondola body includes first and second ends, a first side, a second side, and a bottom assembly. The bottom assembly of the railway gondola car includes a single compartment trough attached to the first side and the second side. The bottom assembly also includes a stiffener attached to the trough, the first side, and the second side.

The invention provides several technical advantages. For example, in one embodiment of the invention, a single compartment trough provides a railway gondola car having greater cargo-carrying capacity than other railway gondola cars by decreasing the amount of space occupied by support structure within the bottom assembly. In the same embodiment, the railway gondola car provides for easier unloading and clean-out than other railway gondola cars.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 9 of the drawings, like numerals being used for like and corresponding parts of the various drawings.

Figure 1:
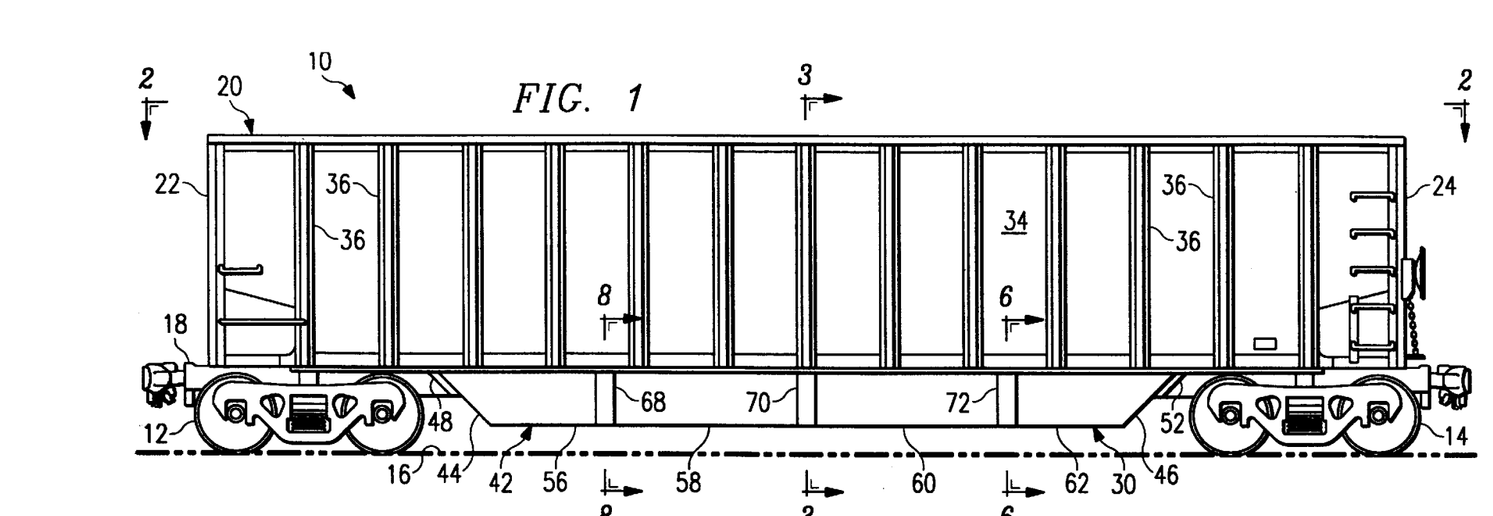
FIG. 1 is a schematic drawing in elevation of a side view of a rotary dump railway gondola car constructed in accordance with the present invention.
Figure 2:
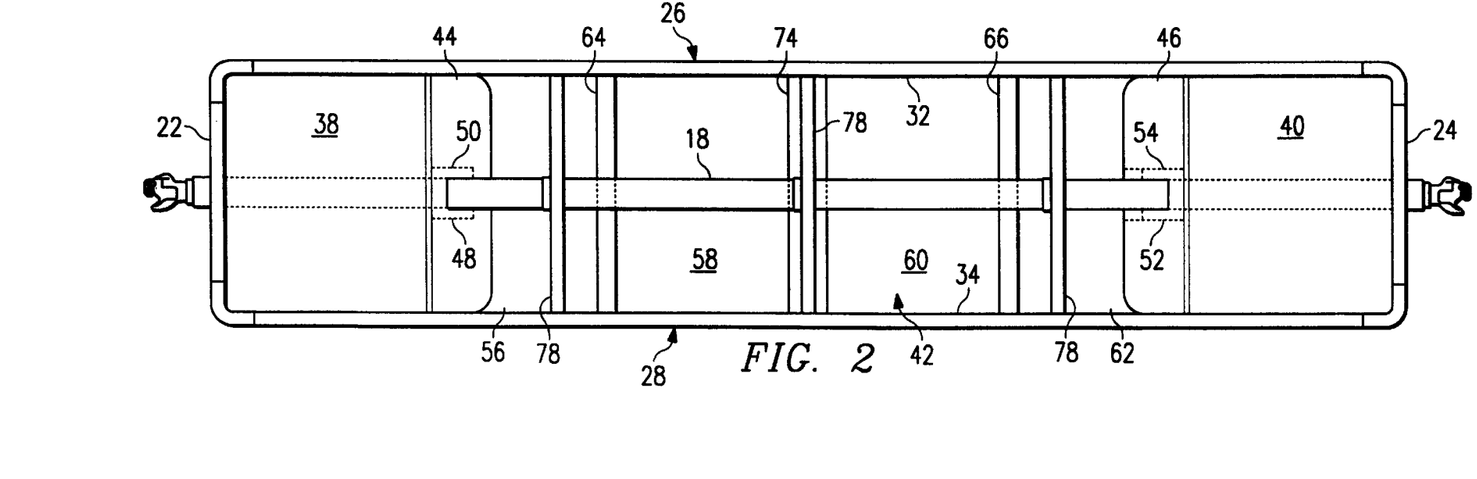
FIG. 2 is a top view of the railway gondola car of FIG. 1.

FIG. 1 illustrates an elevational view of a railway gondola car 10 incorporating the teachings of the present invention, and FIG. 2 illustrates a top plan view of gondola car 10 shown in FIG. 1. Gondola car 10 includes trucks 12 and 14 that support gondola car 10 for movement along tracks 16. Gondola car 10 also includes a center sill 18 extending between trucks 12 and 14. Center sill 18 is pivotally connected to trucks 12 and 14.

Gondola car 10 also includes a gondola body 20. Gondola body 20 includes two ends 22 and 24 and sides 26 and 28. Gondola body 20 also includes a bottom assembly 30. Gondola body 20 and bottom assembly 30 cooperate to provide an open top gondola car 10 for receiving, transporting, and dumping bulk material. In the embodiment of the invention illustrated in FIG. 1, sides 26 and 28 include side walls 32 and 34 and a plurality of side posts 36. Side posts 36 reinforce side walls 32 and 34 for containing material within gondola car 10.

Bottom assembly 30 of gondola car 10 includes floor sections 38 and 40 and a single compartment trough 42. Floor sections 38 and 40 extend from ends 22 and 24, respectively, toward a mid-portion of gondola car 10 between trucks 12 and 14. Bottom assembly 30 also includes end members 44 and 46 attached to opposite ends of trough 42 for closing the ends of trough 42 to contain the bulk material carried by gondola car 10. A plurality of attachment angles 48, 50, 52 and 54 are used to form a closure with end members 44 and 46 to center sill 18. Attachment angles 48, 50, 52 and 54 may be attached to end members 44 and 46 and center sill 18 using bolts or rivets; however, other suitable methods or devices for attaching adjacent structure may be used, such as welding.

In one embodiment of the invention, trough 42 of gondola car 10 includes a plurality of panels 56, 58, 60 and 62. As will be discussed in greater detail below, panels 56, 58, 60 and 62 are secured together with a plurality of internal straps 64 and 66, a plurality of external straps 68, 70 and 72, and a stiffener 74. For example, internal strap 64 and external strap 68 secure together adjacent panels 56 and 58. Internal straps 64 and 66, external straps 68, 70 and 72, and stiffener 74 are also utilized to transfer a load experienced by trough 42 from the bulk material contained within gondola car 10 to a main load bearing structure of gondola car 10. These load transferring structures are described in greater detail with respect to FIGS. 3 through 9.

Figure 3:
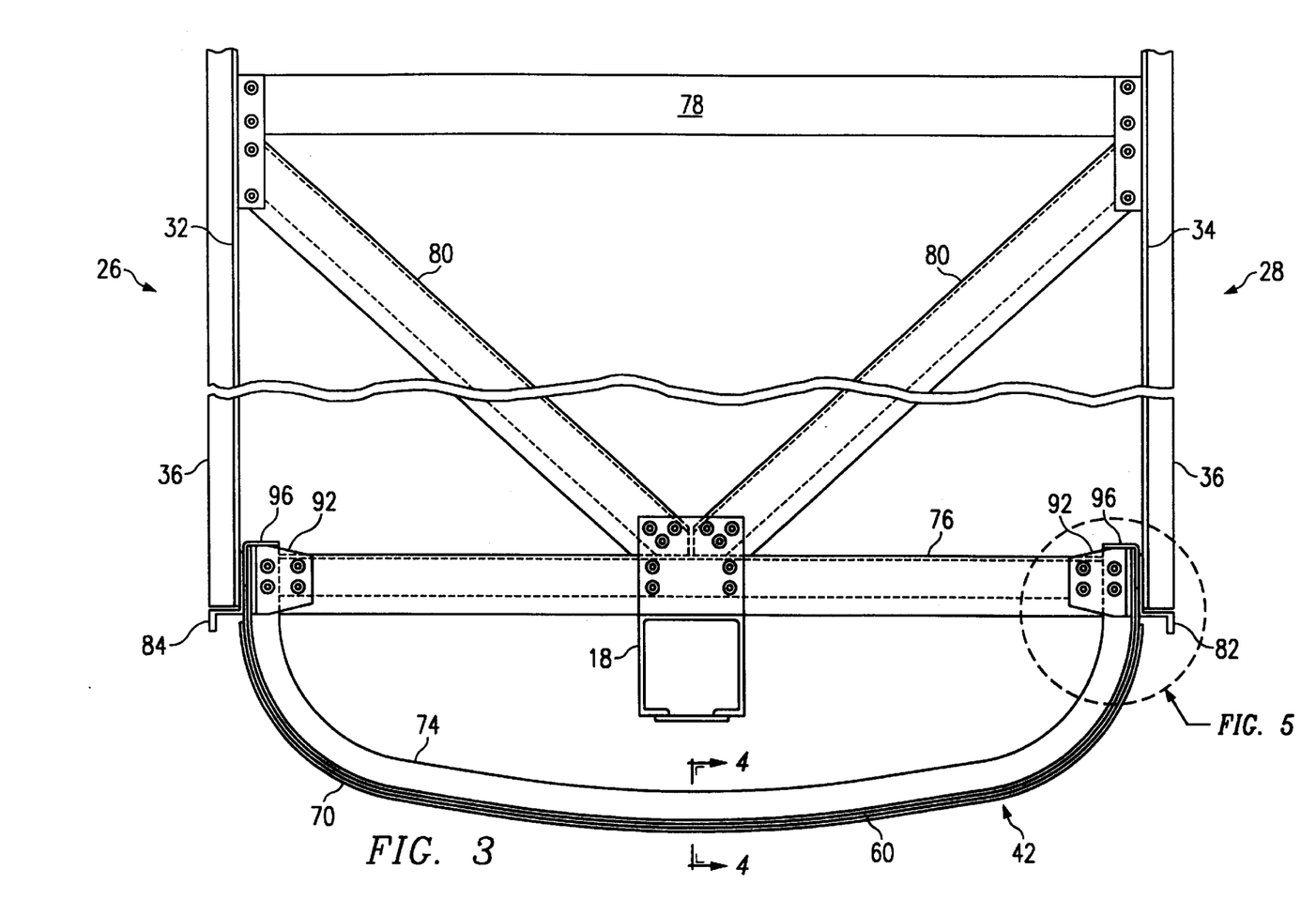
FIG. 3 is a cross sectional view of the railway gondola car of FIG. 1 taken generally along the line 3—3 of FIG. 1.

FIG. 3 illustrates a sectional view of gondola car 10 incorporating the teachings of the present invention taken along the line 3—3 of FIG. 1. In one embodiment of the invention, a plurality of spaced apart transverse internal braces 76 and 78 extending between side 26 and side 28, and a plurality of spaced apart diagonal internal braces 80 extending from sides 26 and 28 to center sill 18, are provided to add structural stability to gondola body 20. Additionally, a plurality of side sills 82 and 84 are provided extending along sides 26 and 28, respectively, between trucks 12 and 14 to add structural stability to gondola body 20 and to transfer a portion of the load experienced by trough 42 to trucks 12 and 14. Side sills 82 and 84 may be constructed having a generally Z-shaped configuration as shown in FIG. 3, or may be constructed having other suitable shapes or configurations for supporting gondola body 20 of gondola car 10.

In the embodiment illustrated, trough 42 is attached to sides 26 and 28 of gondola body 20 and extends beneath center sill 18. Trough 42 may be constructed having a generally concave contour, as shown in FIG. 3, or may be constructed having other suitable contours or configurations. Because trough 42 extends beneath center sill 18, trough 42 requires support structure to prevent deformation of trough 42 resulting from the weight of the bulk material contained within gondola car 10 and to transfer the load experienced by trough 42 to the main load bearing structure of gondola car 10. In the embodiment illustrated, supporting trough 42 is accomplished by stiffener 74 and external strap 70.

As shown in FIG. 3, stiffener 74 substantially conforms to the contour of trough 42 and is attached to an inwardly facing surface of trough 42. External strap 70 also substantially conforms to the contour of trough 42 and is attached to an outwardly facing surface of trough 42. In the embodiment illustrated, external strap 70 is constructed extending from side 26 to side 28 terminating prior to reaching side sills 82 and 84. Trough 42, and more particularly stiffener 74, is described in greater detail in conjunction with FIG. 4.

Figure 4:
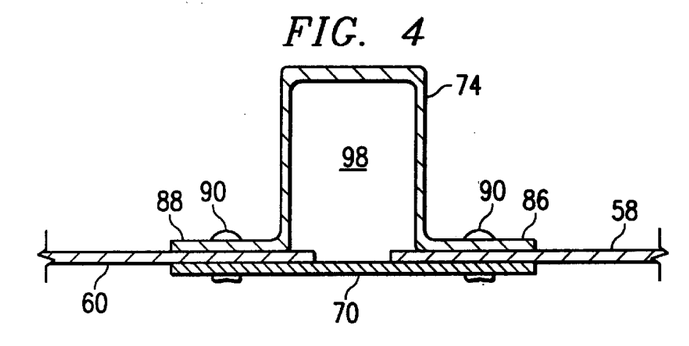
FIG. 4 a cross sectional view of an embodiment of a trough shown in FIG. 3 taken generally along the line 4—4 of FIG. 3.

FIG. 4 illustrates a sectional view of trough 42 shown in FIG. 3 taken along the line 4—4 of FIG. 3. In the embodiment illustrated, trough 42 includes panels 58 and 60. Additionally, stiffener 74 is constructed having a generally hat-shaped configuration; however, stiffener 74 may be constructed having other suitable shapes and configurations for supporting trough 42. Although other suitable stiffener configurations may be used, a hat-shaped configuration is particularly advantageous because of its relatively high section modulus.

In the embodiment described above, mounting flanges 86 and 88 of stiffener 74 are attached to panels 58 and 60, respectively, and external strap 70. Thus, stiffener 74 and external strap 70 secure together adjacent panels 58 and 60. Stiffener 74, panels 58 and 60, and external strap 70 may be secured together using fasteners 90, such as bolts or rivets, or may be secured together using other suitable methods or devices for attaching adjacent structure, such as welding or a combination of fasteners and welding. The attachment of stiffener 74 and other portions of trough 42 to sides 26 and 28 in order to transfer load is described in greater detail in conjunction with FIG. 5.

Figure 5:
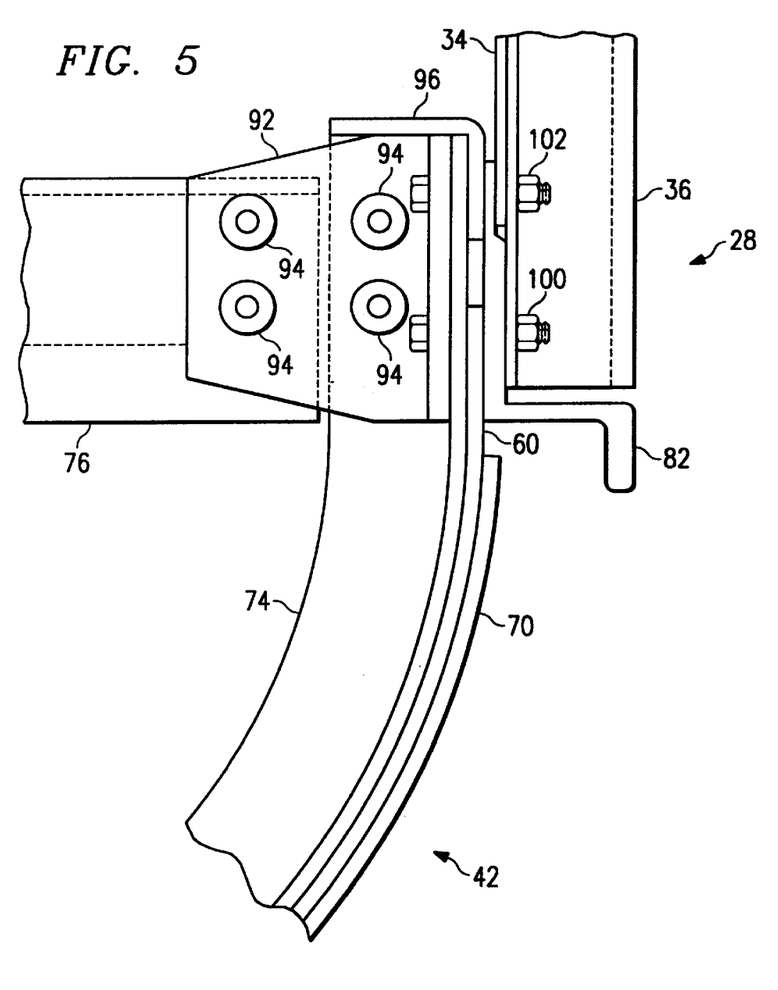
FIG. 5 is an enlarged drawing partially in elevation and partially in section showing a side portion of the trough shown in FIG. 3 and its engagement with a side of the railway gondola car.

FIG. 5 illustrates an enlarged view showing a side portion of trough 42 attached to side 28 of gondola body 20. In the embodiment illustrated, a plurality of fittings 92 secure together trough 42, stiffener 74, and internal brace 76. Fittings 92 are disposed frontwardly and rearwardly of stiffener 74 and internal brace 76 so that stiffener 74 and internal brace 76 are disposed between fittings 92. Fasteners 94 may be used to secure fittings 92, trough 42, stiffener 74, and internal brace 76 together, such as bolts or rivets; however, other suitable methods or devices for securing adjacent structure may be used. A plurality of fittings 96 are also provided to prevent bulk material within gondola car 10 from entering an internal region 98 of stiffener 74, as best illustrated in FIG. 4.

Referring to FIG. 5, in the illustrated embodiment, trough 42 is disposed between side sill 82 and stiffener 74, and is secured to side 28 of gondola body 20 using fasteners 100 extending through fittings 92, stiffener 74, trough 42, side sill 82, side wall 34, and side post 36. Additionally, trough 42 is further secured to side 28 with fasteners 102 extending through fittings 92, stiffener 74, fitting 96, side sill 82, side wall 34, and side post 36. Fasteners 102 and 104 may include rivets or bolts; however, other suitable methods or devices for attaching structure may be used. Trough 42 and stiffener 74 are secured to side 26 of gondola body 20 in the same manner as described above for securing trough 42 and stiffener 74 to side 28 of gondola body 20. Thus, the load experienced by trough 42 is transferred to sides 26 and 28 and side sills 82 and 84 using stiffener 74, external strap 70, fittings 92, and internal brace 76. Transferring the load experienced by trough 42 using internal strap 66 and external strap 72 will be discussed in greater detail in conjunction with FIG. 6.

Figure 6:
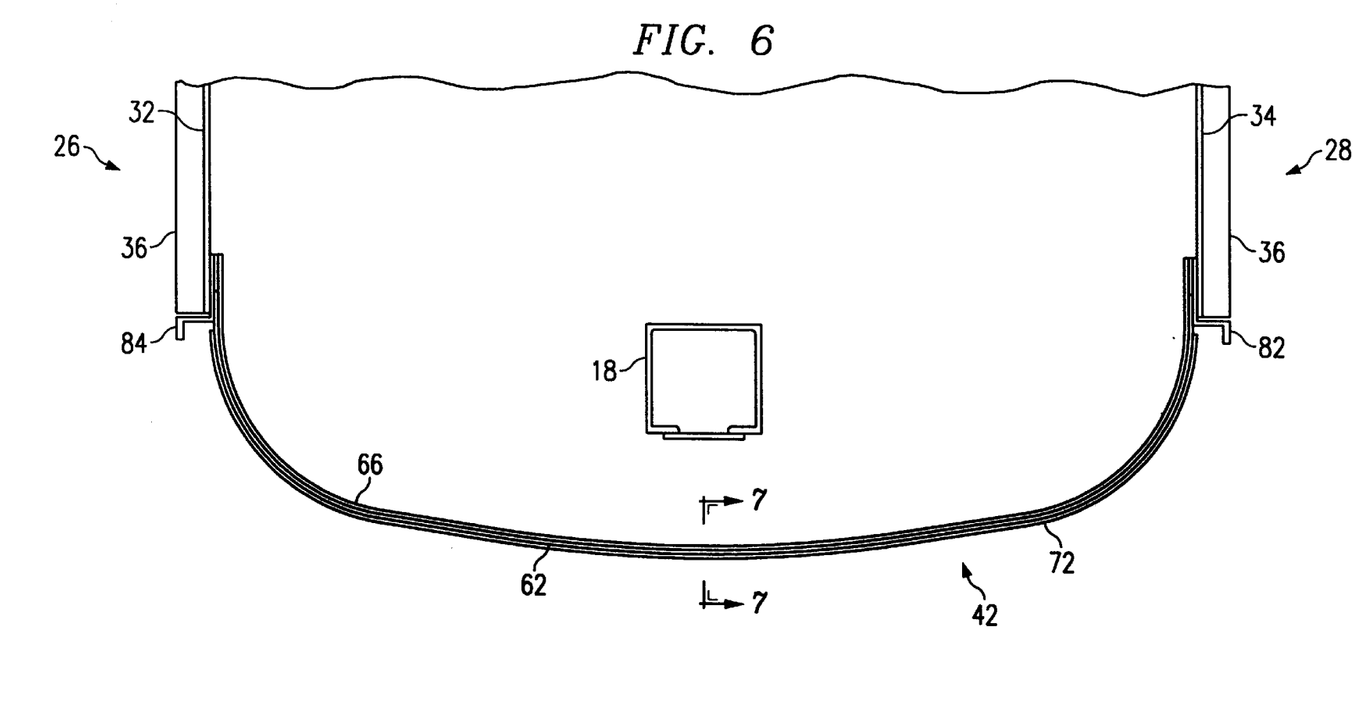
FIG. 6 is a cross sectional view with portions broken away of the railway gondola car of FIG. 1 taken generally along the line 6—6 of FIG. 1.

FIG. 6 illustrates a sectional view of gondola car 10 incorporating the teachings of the present invention taken along the line 6—6 of FIG. 1. In the embodiment illustrated, internal strap 66 substantially conforms to the contour of trough 42 and is attached to an inwardly facing surface of trough 42. External strap 72 also substantially conforms to the contour of trough 42 and is attached to an outwardly facing surface of trough 42. In the embodiment illustrated, external strap 72 is constructed extending from side 26 to side 28 terminating prior to reaching side sills 82 and 84. The attachment of internal strap 66 and external strap 72 to trough 42 will be discussed in greater detail in conjunction with FIG. 7.

Figure 7:
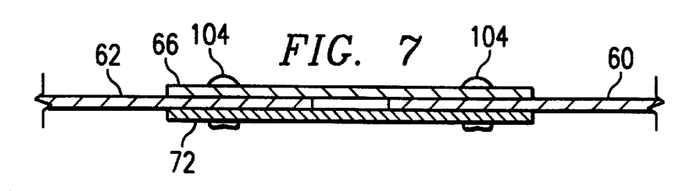
FIG. 7 is a cross sectional view of an embodiment of a trough shown in FIG. 6 taken generally along the line 7—7 of FIG. 6.

FIG. 7 illustrates a sectional view of an embodiment of trough 42 shown in FIG. 6 taken along the line 7—7 of FIG.

6. In the embodiment illustrated, trough 42 includes panels 60 and 62. Internal strap 66 is attached to inwardly facing surfaces of panels 60 and 62. External strap 72 is attached to outwardly facing surfaces of panels 60 and 62. Internal strap 66 and external strap 72 are attached to panels 60 and 62 using fasteners 104, such as bolts or rivets; however, other suitable methods or devices for attaching adjacent structure may be used. Thus, in the embodiment illustrated, internal strap 66 and external strap 72 secure together adjacent panels 60 and 62.

Referring to FIG. 6, trough 42 and internal strap 66 may be attached to side 26 using fasteners (not explicitly shown), such as rivets or bolts, extending through internal strap 66, trough 42, side sill 84, and side wall 32; however, other suitable methods or devices for attaching structure may be used to secure trough 42 and internal strap 66 to sides 26 and 28 of gondola body 20. Trough 42 and internal strap 66 are secured to side 28 in the same manner as described above for securing trough 42 and internal strap 66 to side 26 of gondola body 20. Thus, the load experienced by trough 42 is transferred to sides 26 and 28 and side sills 82 and 84 using internal strap 66 and external strap 72. Transferring the load experienced by trough 42 using internal strap 64 and external strap 68 will be discussed in greater detail in conjunction with FIG. 8.

Figure 8:
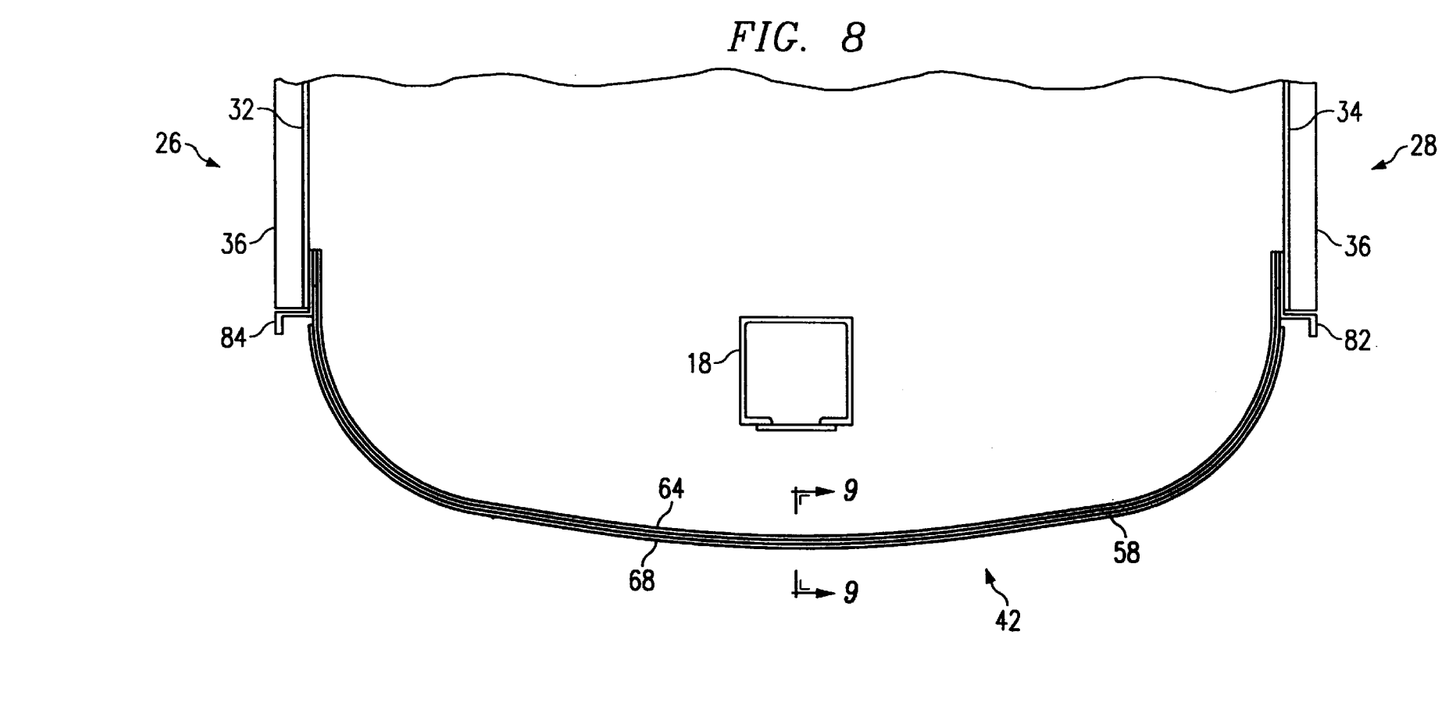
FIG. 8 is a cross sectional view with portions broken away of the railway gondola car of FIG. 1 taken generally along the line 8—8 of FIG. 1.

FIG. 8 illustrates a sectional view of gondola car 10 according to the teachings of the present invention taken along the line 8—8 of FIG. 1. In the embodiment illustrated, internal strap 64 substantially conforms to the contour of trough 42 and is attached to an inwardly facing surface of trough 42. External strap 68 also substantially conforms to the contour of trough 42 and is attached to an outwardly facing surface of trough 42. As shown in FIG. 8, external strap 68 terminates prior to reaching side sills 82 and 84. The attachment of internal strap 64 and external strap 68 to trough 42 will be discussed in greater detail in conjunction with FIG. 9.

Figure 9:
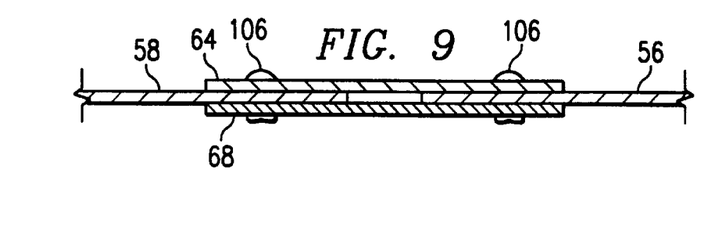
FIG. 9 is a cross sectional view of an embodiment of a trough shown in FIG. 8 taken generally along the line 9—9 of FIG. 8.

FIG. 9 is a sectional view of an embodiment of trough 42 shown in FIG. 8 taken along the line 9—9 of FIG. 8. In the embodiment illustrated, trough 42 includes panels 56 and 58. Internal strap 64 is attached to inwardly facing surfaces of panels 56 and 58, and external strap 68 is attached to outwardly facing surfaces of panels 56 and 58. Internal strap 64 and external strap 68 may be attached to panels 56 and 58 using fasteners 106, such as rivets or bolts; however, other suitable methods and devices for attaching adjacent structure may be used. Thus, in the embodiment illustrated, internal strap 64 and external strap 68 secure together adjacent panels 56 and 58.

Referring to FIG. 8, trough 42 and internal strap 64 are secured to side 26 of gondola body 20 using fasteners (not explicitly shown), such as rivets or bolts, extending through trough 42, internal strap 64, side sill 84, and side wall 32; however, other suitable methods and devices for attaching adjacent structure may be used. Trough 42 and internal strap 64 are attached to side 28 in the same manner as described above for attaching trough 42 and internal strap 64 to side 26 of gondola body 20. Thus, the load experienced by trough 42 is transferred to sides 26 and 28 and side sills 82 and 84 using internal strap 64 and external strap 68.

In operation, internal straps 64 and 66, external straps 68, 70 and 72, and stiffener 74 support trough 42. Thus, internal straps 64 and 66, external straps 68, 70 and 72, and stiffener 74 transfer a portion of the load experienced by trough 42 caused from bulk material contained within trough 42 to sides 26 and 28 of gondola car 10. Side sills 82 and 84 further transfer a portion of the load from sides 28 and 26, respectively, to trucks 12 and 14. Thus, internal straps 64 and 66, external straps 68, 70 and 72, and stiffener 74 occupy minimal space within trough 42 while effectively transferring a portion of the load experienced by trough 42 to the load carrying structure of gondola car 10.

Another technical advantage of the present invention is the ability to cost effectively construct trough 42 using panels 56, 58, 60 and 62. For example, a material selected to construct panels 56, 58, 60 and 62 may be available in a particular stock width, for example, ninety-six inches. Trough 42 may be designed so that the width of each panel 56, 58, 60 and 62, as measured along a line extending between trucks 12 and 14, is substantially equal to ninety-six inches, thereby reducing the number of additional manufacturing operations performed to construct trough 42.

Although the present invention and its advantages have been described in detail, it should be understood that various changes, substitutions, and alterations, can be made therein without departing from the spirit and scope of the present invention as defined by the appended claims.

What is claimed is:

1. A railway gondola car having trucks for movably supporting the car on railway tracks, the railway gondola car comprising:
   a center sill;
   a gondola body supported by the trucks, the gondola body having first and second ends, a first side, a second side and a bottom assembly, the bottom assembly comprising:
   a trough disposed between the trucks and attached to the first side and the second side;
   a generally hat-shaped stiffener attached to the trough, the first side, and the second side; and
   a strap attached to the trough on a surface of the trough opposite the hat-shaped stiffener.

2. The gondola car of claim 1, wherein the strap is further attached to the hat-shaped stiffener.

3. A railway gondola car having trucks for movably supporting the car on railway tracks, the railway gondola car comprising:
   a center sill;
   a gondola body supported by the trucks, the gondola body having first and second ends, a first side, a second side and a bottom assembly, the bottom assembly comprising:
   a trough disposed between the trucks and attached to the first side and the second side; and
   a generally hat-shaped stiffener attached to the trough, the first side, and the second side, wherein the hat-shaped stiffener is attached to an inwardly facing surface of the trough.

4. The gondola car of claim 3, wherein the hat-shaped stiffener is secured to the trough approximately equidistant from each of the trucks.

5. A railway gondola car having trucks for movably supporting the car on railway tracks, the railway gondola car comprising:
   a center sill;
   a gondola body supported by the trucks, the gondola body having first and second ends, a first side, a second side and a bottom assembly, the bottom assembly comprising:
   a trough disposed between the trucks and attached to the first side and the second side, the trough comprising a plurality of panels attached to the first side and the second side, a generally hat-shaped stiffener attached to the trough, the first side, and the second side, wherein the hat-shaped stiffener is attached to, and secures together, adjacent panels.

6. The gondola car of claim 5, wherein the bottom assembly further comprises a strap attached to, and securing together adjacent panels, the strap disposed on a surface of the trough opposite the hat-shaped stiffener.

7. A railway gondola car having trucks for movably supporting the car on railway tracks, the railway gondola car comprising:
 a center sill;
 a gondola body supported by the trucks, the gondola body having first and second ends, a first side, a second side and a bottom assembly, the bottom assembly comprising:
  a trough disposed between the trucks and attached to the first side and the second side, the trough comprising a plurality of panels attached to the first side and the second side;
  a generally hat-shaped stiffener attached to the trough, the first side, and the second side;
  an inwardly facing strap attached to, and securing together, adjacent panels; and
  an outwardly facing strap attached to, and securing together, adjacent panels, the external strap disposed on a surface of the panels opposite the internal strap.

8. The gondola car of claim 4, wherein the hat-shaped stiffener substantially conforms to a contour of the trough from the first side to the second side.

9. A railway gondola car including trucks for movably supporting the car on railway tracks, comprising:
 a center sill; and
 a gondola body supported by the trucks, the gondola body having first and second ends, a first side having a first side sill, a second side having a second side sill, and a bottom assembly, the bottom assembly comprising:
  a trough attached to the first side sill and the second side sill;
  a stiffener attached to the trough, the first side sill, and the second side sill; and
  wherein the trough is disposed between the stiffener and the first and second side sills.

10. The gondola car of claim 9, wherein the bottom assembly further comprises:
 a brace extending from the first side to the second side;
 a first fitting coupling the brace, the stiffener, and the first side sill together; and
 a second fitting coupling the brace, the stiffener, and the second side sill together.

11. The gondola car of claim 9, wherein the bottom assembly further comprises a strap attached to the trough on a surface of the trough opposite the stiffener.

12. The gondola car of claim 11, wherein the strap is further attached to the stiffener.

13. The gondola car of claim 9, wherein the trough comprises a plurality of panels attached to the first side sill and the second side sill, and wherein the stiffener is attached to, and secures together, adjacent panels.

14. The gondola car of claim 13, wherein the bottom assembly further comprises a strap attached to, and securing together, adjacent panels, the strap disposed on a surface of the panels opposite the stiffener.

15. The gondola car of claim 9, wherein the trough comprises a plurality of panels attached to the first side sill and the second side sill, and wherein the bottom assembly further comprises:
 an inwardly facing strap attached to, and securing together, adjacent panels, the inwardly facing strap further secured to the first side sill and the second side sill; and
 an outwardly facing strap attached to, and securing together, adjacent panels, the outwardly facing strap disposed on a surface of the panels opposite the inwardly facing strap.

16. The gondola car of claim 9, wherein the stiffener is attached to an inwardly facing surface of the trough.

17. The gondola car of claim 9, wherein the stiffener substantially conforms to a contour of the trough from the first side sill to the second side sill.

18. The gondola car of claim 9, wherein the stiffener comprises a generally hat-shaped stiffener.

19. A bottom assembly for a railway gondola car supported by trucks, the bottom assembly comprising:
 a trough disposed between the trucks, wherein the trough comprises a plurality of panels; and
 a generally hat-shaped stiffener attached to the trough, wherein the stiffener is attached to, and secures together, adjacent panels.

20. The assembly of claim 19, and further comprising a strap attached to, and securing together, adjacent panels, the strap disposed on a surface of the panels opposite the stiffener.

21. A bottom assembly for a railway gondola car supported by trucks, the bottom assembly comprising:
 a trough disposed between the trucks; and
 a generally hat-shaped stiffener attached to an inwardly facing surface of the trough.

22. A bottom assembly for a railway gondola car supported by trucks, the bottom assembly comprising:
 a trough disposed between the trucks, the trough comprising a plurality of panels;
 a generally hat-shaped stiffener attached to the trough;
 an inwardly facing strap attached to, and securing together, adjacent panels; and
 an outwardly facing strap attached to, and securing together, adjacent panels, the outwardly facing strap disposed on a surface of the panels opposite the inwardly facing strap.

23. The assembly of claim 21, wherein the stiffener is attached to the trough approximately equidistant from each of the trucks.

24. A bottom assembly for a railway gondola car supported by trucks, the bottom assembly comprising:
 a trough disposed between the trucks;
 a generally hat-shaped stiffener attached to the trough; and
 a strap attached to the trough on a surface of the trough opposite the stiffener, the strap further attached to the stiffener.

25. The assembly of claim 21, wherein the stiffener substantially conforms to a contour of the trough.

26. A railway gondola car including trucks for movably supporting the car on railway tracks, comprising:
 a center sill extending between the trucks; and
 a gondola body supported by the trucks having first and second ends, a first side, a second side and a bottom assembly, the bottom assembly comprising:
  a single compartment trough attached to the first side and the second side;
  a stiffener attached to the trough, the first side, and the second side; and a strap attached to the trough and disposed on a surface of the trough opposite the stiffener.

27. The gondola car of claim 26, wherein the strap is further attached to the stiffener.

28. A railway gondola car including trucks for movably supporting the car on railway tracks, comprising:
   a center sill extending between the trucks; and
   a gondola body supported by the trucks having first and second ends, a first side, a second side and a bottom assembly, the bottom assembly comprising:
      a single compartment trough attached to the first side and the second side; and
      a stiffener attached to the trough, the first side, and the second side, wherein the stiffener is disposed approximately equidistant from each of the trucks.

29. A railway gondola car including trucks for movably supporting the car on railway tracks, comprising:
   a center sill extending between the trucks; and
   a gondola body supported by the trucks having first and second ends, a first side, a second side and a bottom assembly, the bottom assembly comprising:
      a single compartment trough attached to the first side and the second side, wherein the trough comprises a plurality of panels attached to the first side and the second side; and
      a stiffener attached to the trough, the first side, and the second side, wherein the stiffener is attached to, and secures together, adjacent panels.

30. The gondola car of claim 29, wherein the bottom assembly further comprises a strap attached to, and securing together, adjacent panels, the strap disposed on a surface of the panels opposite the stiffener.

31. A railway gondola car including trucks for movably supporting the car on railway tracks, comprising:
   a center sill extending between the trucks; and
   a gondola body supported by the trucks having first and second ends, a first side, a second side and a bottom assembly, the bottom assembly comprising:
      a single compartment trough attached to the first side and the second side, wherein the trough comprises a plurality of panels attached to the first side and the second side;
      a stiffener attached to the trough, the first side, and the second side;
      an inwardly facing strap attached to, and securing together, adjacent panels; and
      an outwardly facing strap attached to, and securing together, adjacent panels, the outwardly facing strap disposed on a surface of the panels opposite the inwardly facing strap.

32. A railway gondola car including trucks for movably supporting the car on railway tracks, comprising:
   a center sill extending between the trucks; and
   a gondola body supported by the trucks having first and second ends, a first side, a second side and a bottom assembly, the bottom assembly comprising:
      a single compartment trough attached to the first side and the second side; and
      a stiffener attached to the trough, the first side, and the second side, wherein the stiffener is disposed on an inwardly facing surface of the trough.

33. The gondola car of claim 32, wherein the stiffener comprises a generally hat-shaped stiffener.

34. The gondola car of claim 32, wherein the stiffener substantially conforms to a contour of the trough from the first side to the second side.

* * * * *